(12) United States Patent
Larouche et al.

(10) Patent No.: US 7,648,004 B1
(45) Date of Patent: Jan. 19, 2010

(54) STEERING WHEEL CONTROL MECHANISM

(75) Inventors: Justin Larouche, Mont-St-Hilaire (CA); Pascal Laplante, St-Bruno-de-Montarville (CA)

(73) Assignee: Novariant Inc., Menlo Park, CA (US)

( * ) Notice: Subject to any disclaimer, the term of this patent is extended or adjusted under 35 U.S.C. 154(b) by 600 days.

(21) Appl. No.: 11/371,601

(22) Filed: Mar. 9, 2006

Related U.S. Application Data

(60) Provisional application No. 60/660,997, filed on Mar. 14, 2005.

(51) Int. Cl.
*B62D 5/02* (2006.01)

(52) U.S. Cl. ............................ 180/443; 180/444

(58) Field of Classification Search ......... 180/443, 180/444
See application file for complete search history.

(56) References Cited

U.S. PATENT DOCUMENTS

| | | | | |
|---|---|---|---|---|
| 4,681,055 A * | 7/1987 | Cyr | ............. | 114/144 E |
| 5,163,337 A * | 11/1992 | Herron et al. | ............. | 74/493 |
| 5,893,430 A * | 4/1999 | Koike | ............. | 180/443 |
| 6,053,270 A * | 4/2000 | Nishikawa et al. | ............. | 180/168 |
| 6,522,962 B2 * | 2/2003 | Millsap et al. | ............. | 701/41 |
| 6,535,806 B2 * | 3/2003 | Millsap et al. | ............. | 701/42 |
| 6,705,424 B2 * | 3/2004 | Ogawa et al. | ............. | 180/446 |
| 6,892,605 B2 * | 5/2005 | Menjak | ............. | 74/552 |
| 7,445,081 B2 * | 11/2008 | Tominaga | ............. | 180/444 |
| 2006/0011402 A1 * | 1/2006 | Green et al. | ............. | 180/312 |
| 2006/0015251 A1 * | 1/2006 | Lange et al. | ............. | 701/213 |
| 2006/0149446 A1 * | 7/2006 | Nelson | ............. | 701/41 |

FOREIGN PATENT DOCUMENTS

WO   WO 2004/005113   1/2004

OTHER PUBLICATIONS

"AgGPS EZ-Steer Assisted Steering System," 4 pages, Jan. 18, 2005.
"EZ-Steer System—Affordable Assisted Steering," www.agleader.com/docs/press/release-ezsteer.htm, 3 pages, Dec. 1, 2004.
"EZ-Steer," www.ex-steer.com/home.shtml, 2 pages, printed Mar. 4, 2006.
"CPT Autopilot," 1 page, 1999.

* cited by examiner

*Primary Examiner*—Lesley D Morris
*Assistant Examiner*—Michael R Stabley
(74) *Attorney, Agent, or Firm*—Brinks Hofer Gilson & Lione

(57) ABSTRACT

The present invention generally relates to control mechanisms and more specifically to a control mechanism which is adaptable to a steering wheel of a vehicle. Most control mechanisms of auto-piloting systems which must be installed on existing vehicles usually require more specific parts and more expensive installations. The control mechanism according to embodiments of the present invention includes components readily installable into the cabin of an existing vehicle and involves elements sandwiching the steering wheel of the vehicle which are operatively mounted to a motoring assembly actuatable by the user of the vehicle.

19 Claims, 9 Drawing Sheets

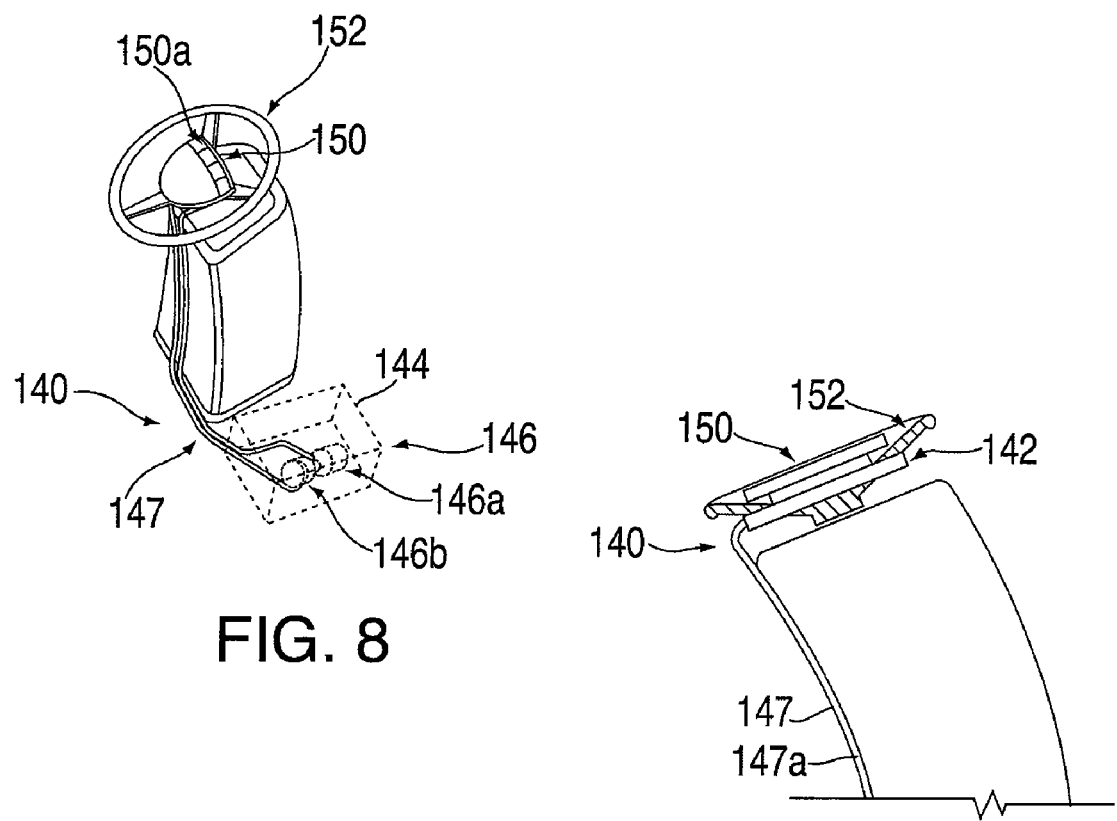
FIG. 8
FIG. 9
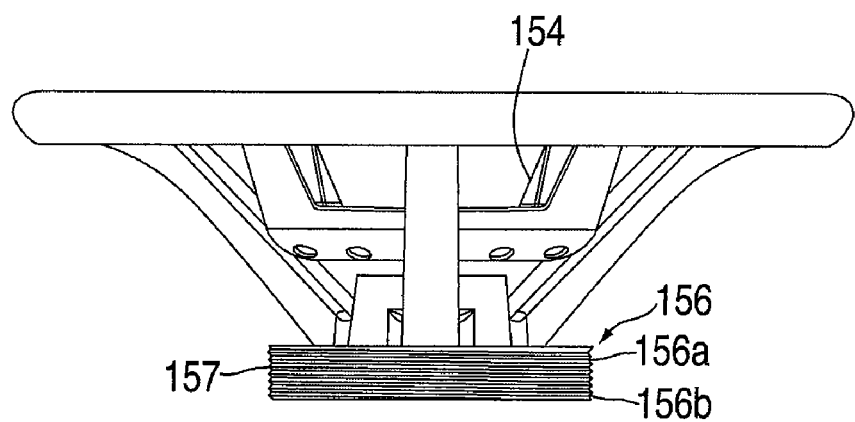
FIG. 10

STEERING WHEEL CONTROL MECHANISM

CROSS-REFERENCE TO RELATED APPLICATION

This application claims the benefit of U.S. Provisional Application No. 60/660,997, filed Mar. 14, 2005, which is hereby incorporated by reference.

FIELD OF THE INVENTION

The present invention generally relates to control mechanisms. More specifically, the present invention is concerned with a control mechanism for a steering wheel of a vehicle.

BACKGROUND OF THE INVENTION

The constant need to increase productivity and to design reliable tools to accomplish various productive activities has led to a plurality of developments in many fields of technology.

In agriculture, many types of tools and working vehicles are available to accomplish the various tasks at hand. The number of tasks and the size of fields and lands which needs to be taken care often necessitate very efficient machineries and tools, especially when the laws of market and productivities are involved.

These past years, many agricultural operations have been automated to achieve more precision and to optimize time, money and product resources. As an example, auto-piloting systems have already been introduced for agricultural vehicles.

Most of these auto-piloting systems necessitate an electro-hydraulic control box mounted on the steering servo-direction of the vehicle. Even though this solution proves to be robust and reliable since the user stays in control on board of the vehicle when the system is operating, such auto-piloting systems often requires specific parts for specific vehicles and a more expensive installation involving hydraulics. Further, the installation of such systems on existing vehicle may annul the warranty of other parts of vehicles which were not initially designed to interface with the components of the control mechanisms.

OBJECTS OF THE INVENTION

An object of the present invention is therefore to provide a steering wheel control mechanism which is easily fabricated and installed on new and existing vehicles.

A further object of the present invention is to provide a steering wheel control mechanism which allows the user of a vehicle to operate and disable the steering mechanism upon request.

BRIEF DESCRIPTION OF THE DRAWINGS

In the appended drawings:

FIG. 8 is a perspective view of a steering control mechanism according to a second embodiment of the present invention;

FIG. 9 is a side elevation view of the steering control mechanism of in FIG. 8; and FIG. 10 is a side elevation view showing a steering assembly of the control mechanism of FIG. 8.

DETAILED DESCRIPTION

Figure 1:
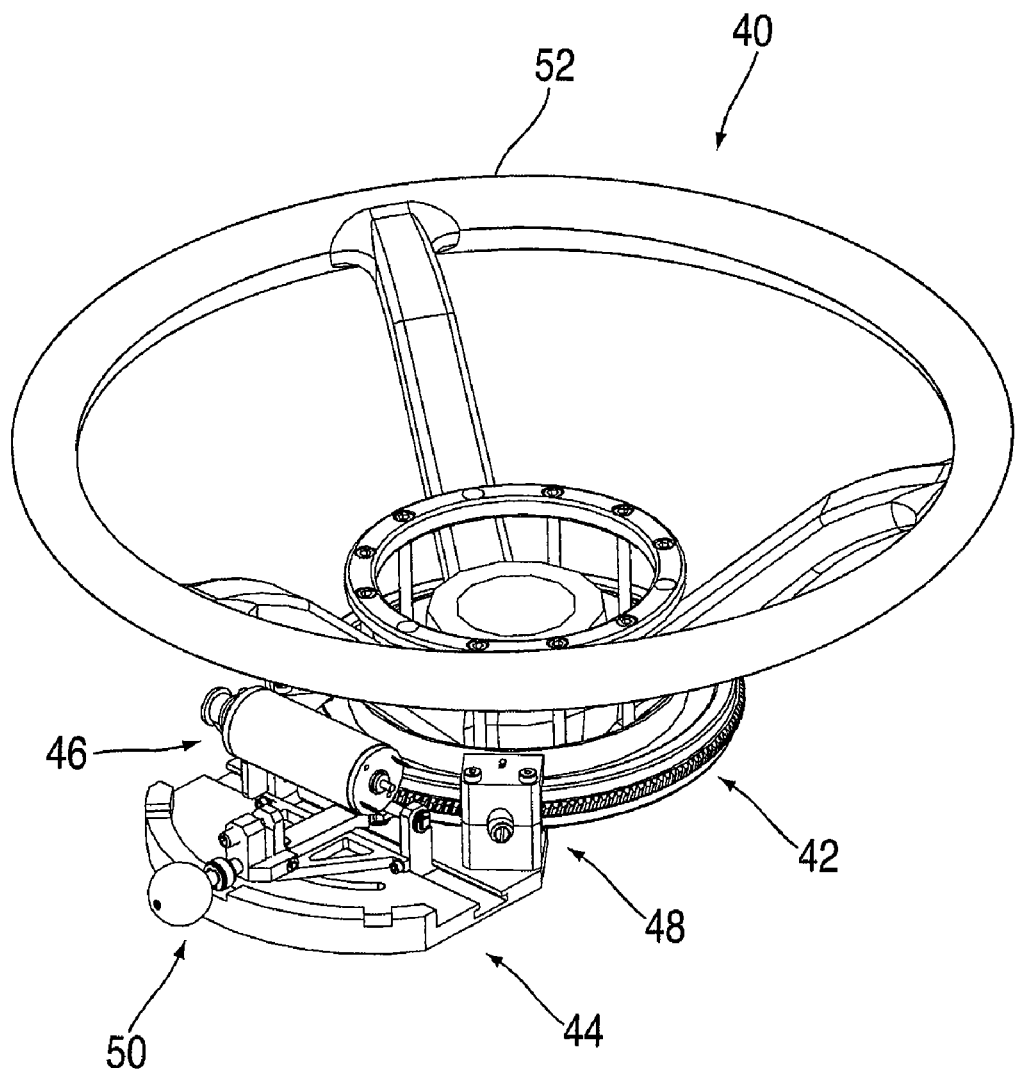
FIG. 1 is a perspective view of a steering control mechanism according to an embodiment of the present invention.
Figure 2:
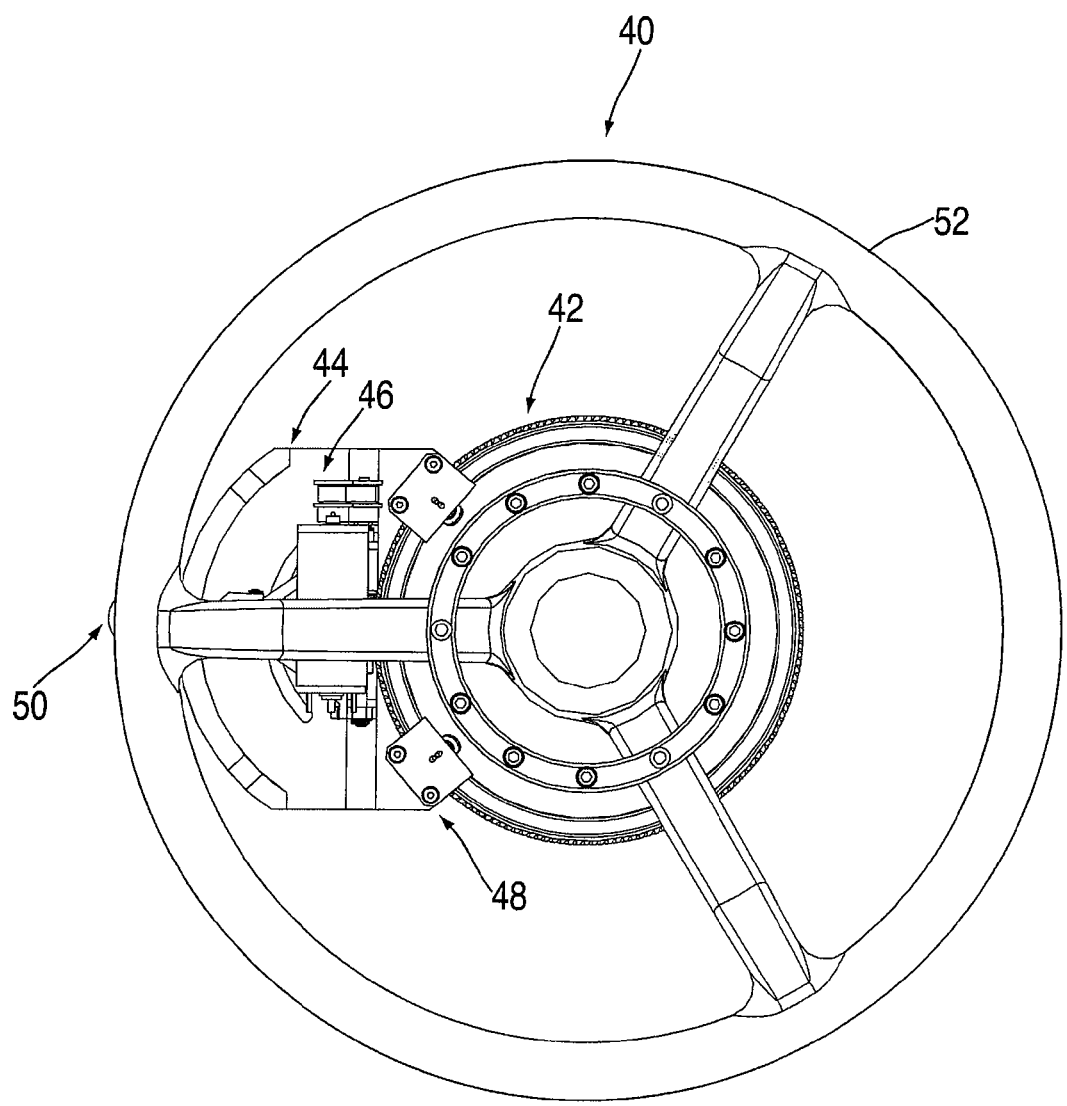
FIG. 2 is a top plan view of the steering control mechanism of FIG. 1.

The present invention relates to an auto-piloting system with a control mechanism for a steering wheel of a vehicle.

The auto-piloting system generally includes a controller (not shown) linked to a GPS (not shown) for controlling a steering wheel control mechanism 40, as illustrated in FIGS. 1 to 4. The control mechanism 40 includes a steering assembly 42, a mounting structure 44, a motoring assembly 46, a guiding structure 48, and an actuating assembly 50.

The control mechanism 40 is mountable to the steering wheel 52 of a vehicle and generally extends in the vicinity of the steering wheel 52, integrated or not to the frame of the steering wheel or to the vehicle.

Figure 5:
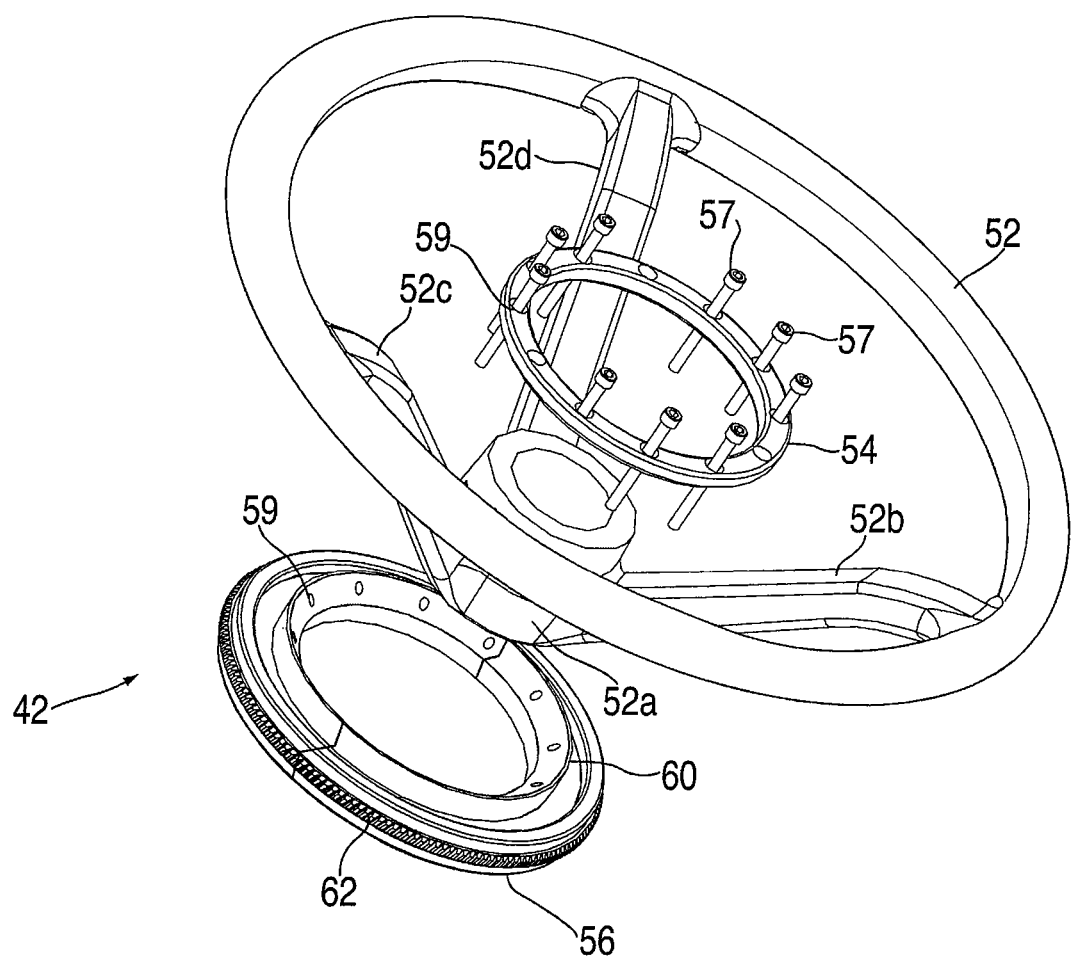
FIG. 5 is a partially exploded perspective view showing a steering assembly of the steering control mechanism of FIG. 1.

Turning now to FIG. 5, the steering assembly 42 includes a top element 54 and a bottom element in the form of a ring gear 56 which altogether sandwich the steering wheel 52 in a clamping assembly using a plurality of fasteners 57 inserted in corresponding openings 59 in the top and bottom elements 54, 56.

The top element 54 is a ring shaped or plated structure which may be provided with a cover (not shown) for mounting a control element or for esthetic reasons, as will be further explained hereinbelow.

The ring gear 56 includes a structural body 60 with a peripheral geared surface 62 extending away from the bottom portion 52a of the steering wheel 52. The body 60 is so configured and sized as to be installed around the bottom portion 52a and/or in contact with arms 52b, 52c, 52d extending from the bottom portion 52a of the steering wheel 52. The geared surface 62 is so configured and sized as to cooperate with the motoring assembly 46, as will be further explained hereinbelow. Optionally, the ring gear 56 is made in two parts that are fixedly mountable to one another for facilitating the installation of the ring gear 56 around the bottom portion 52b of the steering wheel 52 of an existing vehicle without requiring the removal of the steering wheel from the vehicle.

Figure 4:
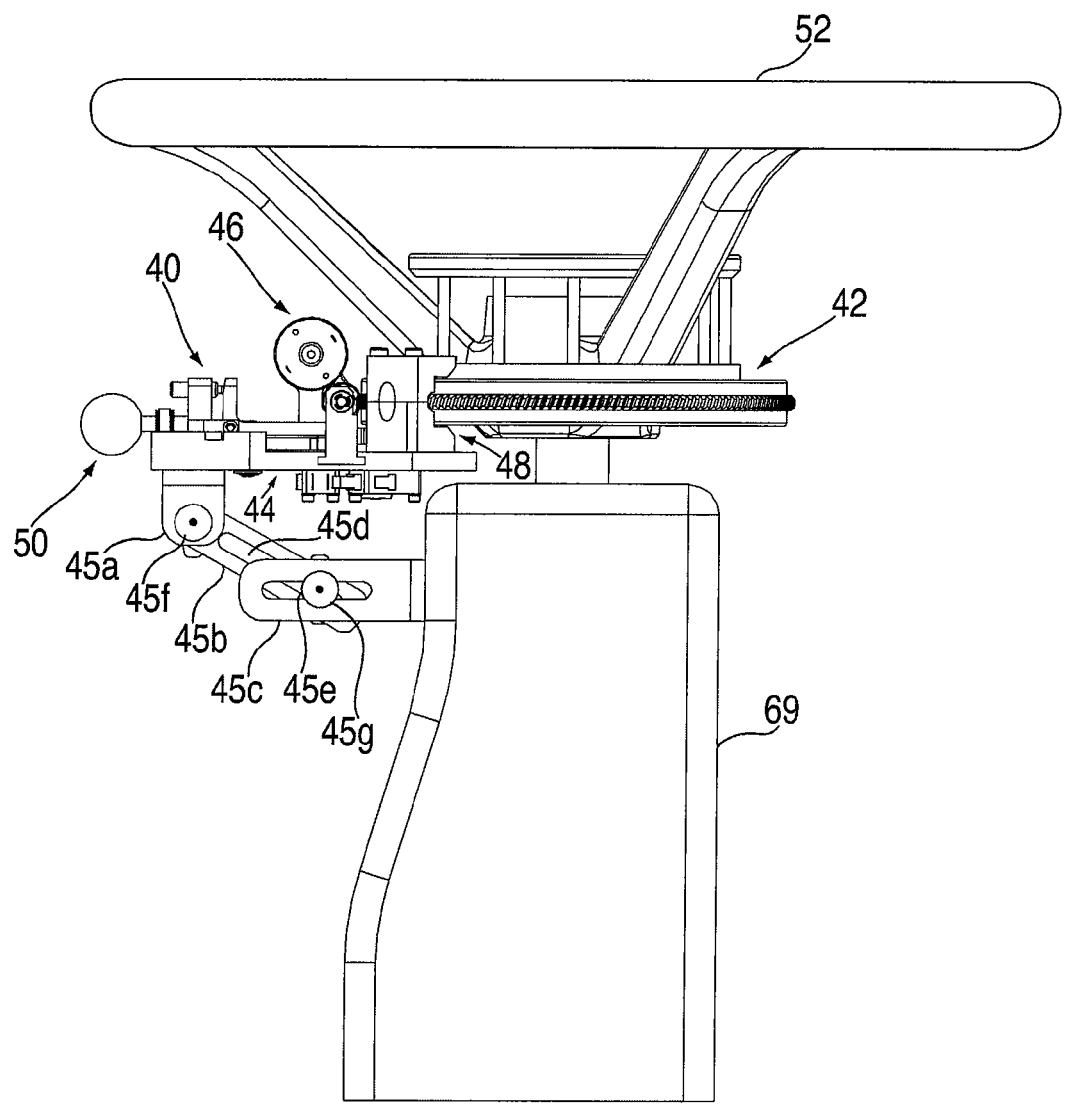
FIG. 4 is a side elevation view of the steering control mechanism of FIG. 1.
Figure 6:
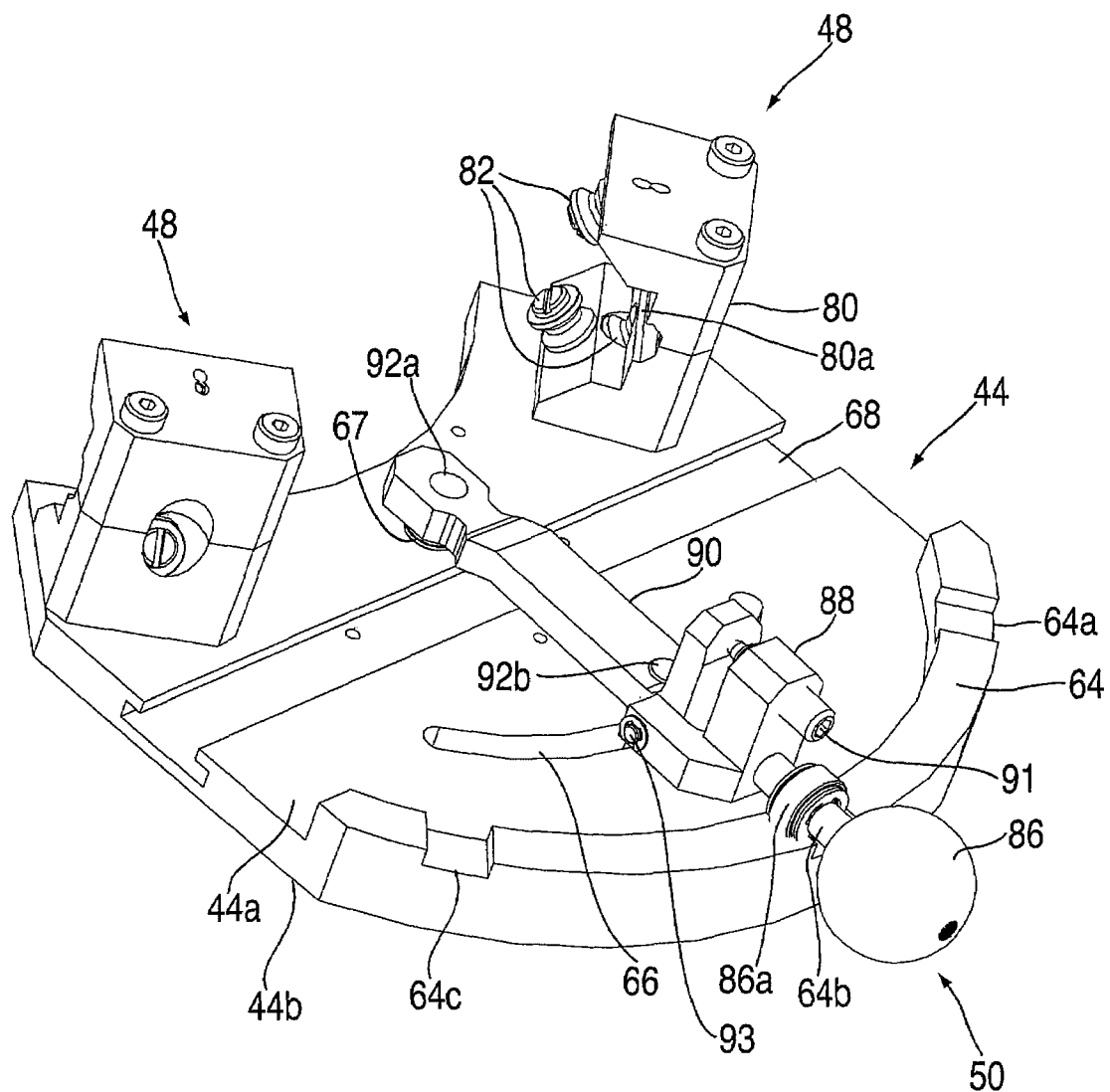
FIG. 6 is a perspective view showing a mounting structure of the steering control mechanism of FIG. 1.

The mounting structure 44 is shown in more details in FIGS. 4 and 6. The mounting structure 44 includes a top mounting surface 44a, a bottom mounting surface 44b, an actuating selector structure 64, a slot 66, a pivotal connector 67 and a T-slot 68.

As illustrated in FIG. 4, the mounting structure 44 is securely mounted to the vehicle 69 via supporting brackets 45a, 45b, 45c, such that the steering wheel 52 is able to be turned upon operation of the control mechanism 40. The supporting brackets 45a, 45b, 45c further helps to provide pivotal and translational adjustability via slots 45d, 45e and pins 45f, 45g to allow the installation of the control mechanism 40 on various types of vehicle 69 and steering wheel 52.

As illustrated in FIG. 6, the top mounting surface 44a of the mounting structure 44 faces the steering wheel 52 and generally provides a rigid area for mounting the guiding structures 48 and for mounting and operating the motoring assembly 46 and the actuating assembly 50.

The actuating selector structure 64 includes three recesses 64a, 64b, 64c corresponding to selectable engaged and disengaged positions of the actuating assembly 50 for operating the control mechanism 40 between an engaged configuration and a disengaged configuration. The recesses 64a, 64b, 64c are selectable via the slot 66 and the pivotal connection 67 arrangement linking the mounting structure 44 with the actuating assembly 50, as will be further explained hereinbelow. In the illustrative embodiment, recess 64b corresponds to the engaged position and recesses 64a, 64c both correspond to the disengaged position.

The T-slot 68 extends on the mounting structure 44 such as to provide a locking capacity for stopping the operation of the control mechanism 40 by involving the actuating assembly 50 in the disengaged position and the motoring assembly 46, as will be further explained hereinbelow.

Figure 3:
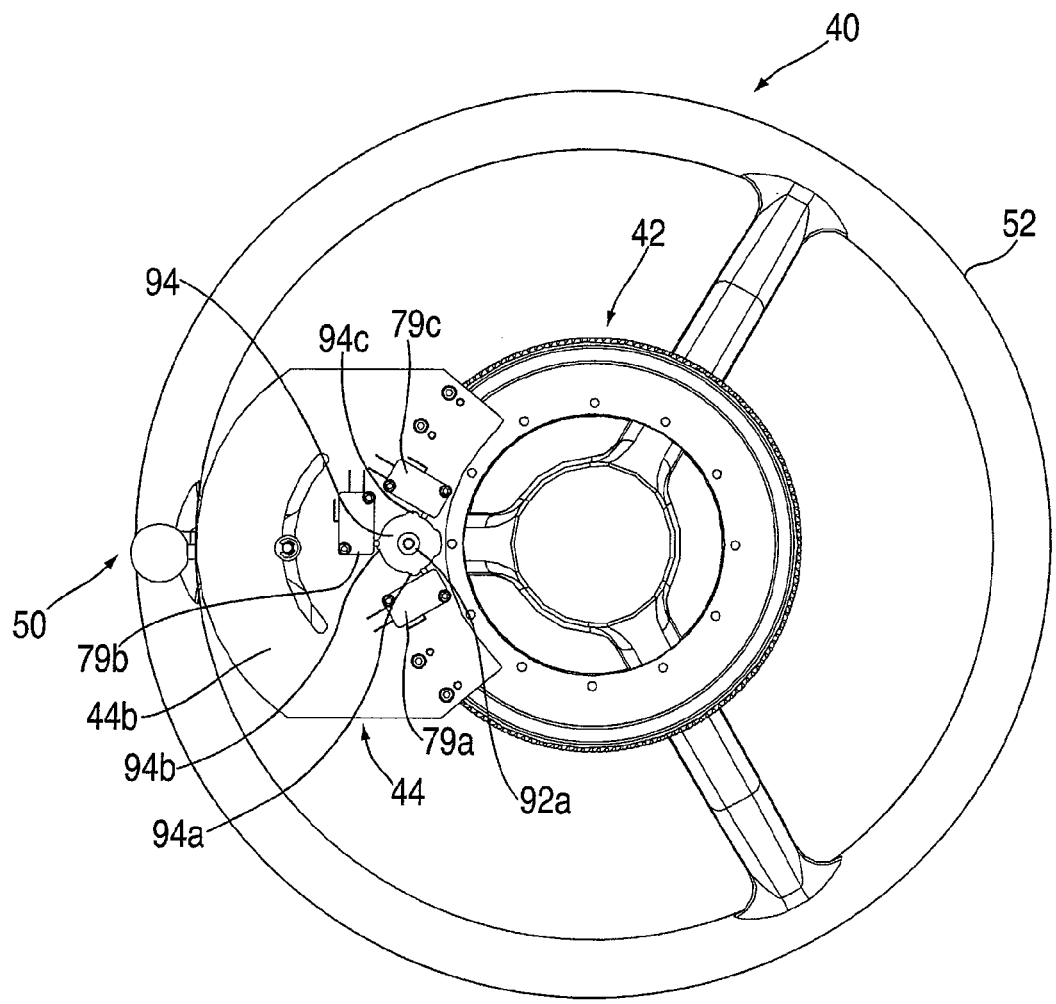
FIG. 3 is a bottom plan view of the steering control mechanism of FIG. 1.
Figure 7:
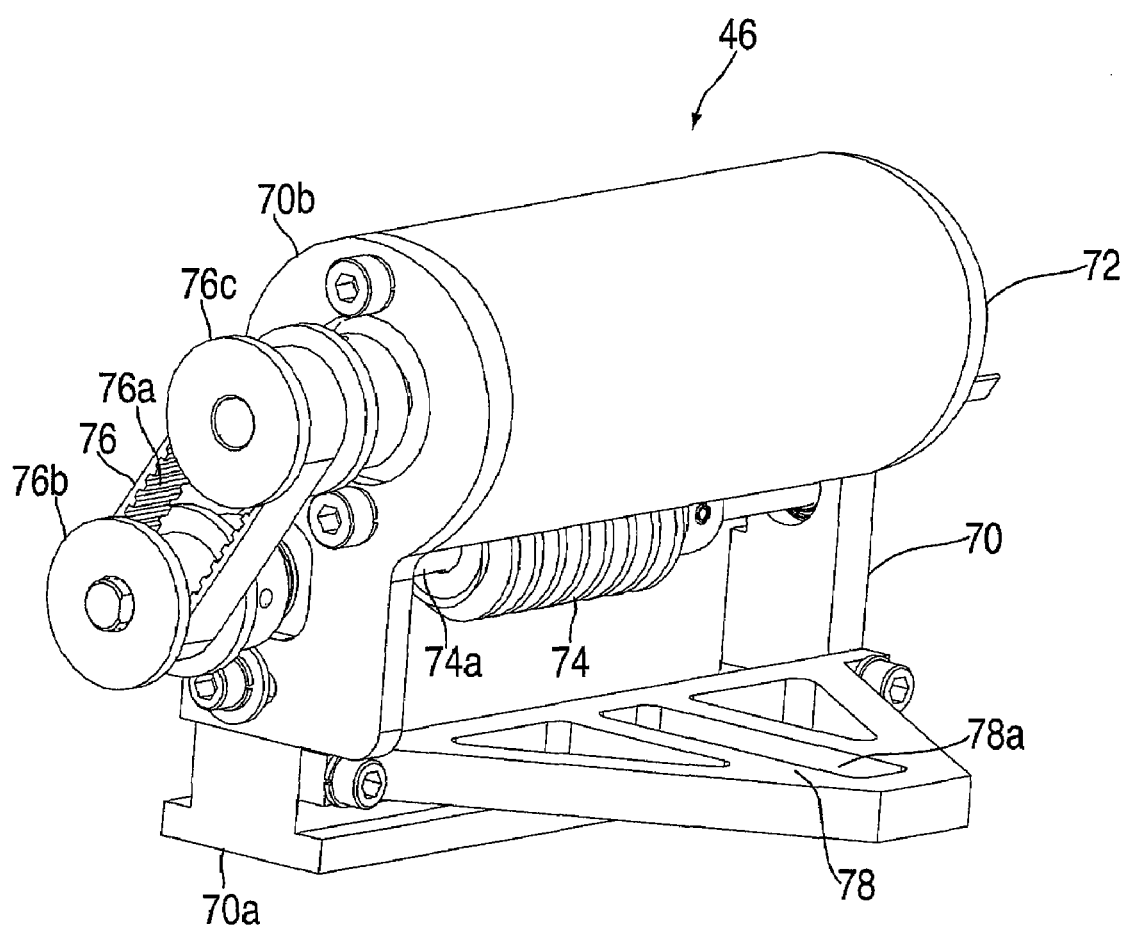
FIG. 7 is a perspective view showing a motoring assembly of the steering control mechanism of FIG. 1.

The motoring assembly 46, illustrated in more details in FIG. 7, includes a supporting structure 70, an electric motor 72, a worm gear 74, a driving assembly 76, a lock structure 78 and switches 79a, 79b, 79c (FIG. 3).

The supporting structure 70 includes an attachment portion 70a so configured and sized as to be mounted to the mounting structure 44 and a holding portion 70b for supporting the electric motor 72 and for positioning the worm gear 74 in a meshing cooperation with the ring gear 56 (FIG. 5). In the illustrative embodiment, the attachment portion 70a is slidably mountable within the T-slot 68 (FIG. 6).

The electric motor 72 is in communication with the controller, such as for example via a cable (not shown), such that a signal generated by the auto-piloting system and processed by the controller is capable of imparting a specified operating condition to the worm gear 74 via the electric motor 72, as will be further explained hereinbelow.

The worm gear 74 is so configured and sized as to mesh with the ring gear 56. Further, the worm gear 74 is rotatably mounted to the holding portion 70b via a shaft 74a that is operatively linked to the electric motor via the driving assembly 76. In the illustrative embodiment, the driving assembly 76 includes a belt 76a operatively connected to pulleys 76b, 76c that are respectively mounted to the electric motor 72 and to the shaft 74a.

The lock structure 78 is mounted to and extends from the attachment portion 70 toward the actuating assembly 50 and includes a slider aperture 78a in the vicinity of the actuating assembly 50 for stopping or disengaging the operation of the control mechanism 40, as will be further explained hereinbelow.

The switches 79a, 79b, 79c, illustrated as limit-switches in FIG. 3, are generally mounted on the bottom surface 44b of the mounting structure 44 and positioned in such a way as to cooperate by direct contact or by signal with the actuating assembly 50 for switching the electrical power from the controller to the electric motor 72 between an "on" and "off" mode, and for recognizing the positions and the transitions between the positions of the actuating assembly 50, as will be further explained hereinbelow.

Turning back to FIG. 6, there is furthermore illustrated two guiding structures 48, each including a housing 80 and three roller guides 82. The housing 80 includes a recessed passage 80a for supporting the guides 82 and allow passage of the ring gear 56 therethrough. The housing 80 is fixedly mounted and oriented with respect to the mounting structure 42 (FIG. 5) such that geared surface 62 (FIG. 5) of the ring gear 56 (FIG. 5) is received with a clearance within the passage 80a and such that the guides 82 support the body 60 (FIG. 5) of the ring gear 56 (FIG. 5).

In the illustrative embodiment, the guides 82 have a generally v-shaped configuration which cooperates with edges (not shown) of the body 60 (FIG. 5), thereby maximizing the relative alignment between the steering assembly 42 and the motoring assembly 46. Alternatively, the guides 82 could be directly mounted to the mounting structure 42.

Finally, the actuating assembly 50 illustrated in FIG. 6 includes a handle portion 86, a joint assembly 88, a link 90, a spring member 91, pins 92a, 92b and a cam 94 (FIG. 3). The handle portion 86 extends from the control mechanism 40 such as to be readily gripped by a user of the vehicle, generally in the vicinity of the steering wheel 52.

As introduced hereinabove, the handle portion 86 is selectively positionable with respect to the notches 64a, 64b, 64c, for actuating the control mechanism 40 from an engaged configuration to a disengaged configuration. In the illustrative embodiment, the handle portion 86 includes a roller 86a for facilitating the passage of the handle portion 86 in between the various recesses 64a, 64b, 64c.

The joint assembly 88 is fixedly mounted on one side to the handle portion 86. The joint assembly 88 is so pivotally mounted to the link 90 as to pivot about an axis defined by a pin 93, in order to allow the disengagement of the handle portion 86 from the various recesses 64a, 64b, 64c without having to bend the link 90 in the process.

The link 90 generally ensures the movable connection between the actuating assembly 50 and the mounting assembly 44 via the pin 92a engaged in the pivotal connection 67 and the pin 92b engaged in the arcuate slot 66.

The spring member 91 is generally mounted to the joint assembly 88 and extends toward the link 90 such as to exert an adjustable tensioning force opposing to the relative pivotal movement between the joint assembly and the link 90 about pin 93. When the tensioning force is brought to a minimal level, a movement of the steering wheel 52 is generally enough to disengage the steering mechanism 40, as will be further explained hereinbelow.

As better seen in FIG. 3, the pin 92a is mounted to the link 90 and terminates with the cam 94, which includes contactors in the form of projections 94a, 94b, 94c. The cam 94 is generally positioned and oriented with respect to the switches 79a, 79b, 79c such that contactor 94b is in contact with the switch 79b (the "on" mode) when the actuating assembly 50 is engaged with recess 64b (the engaged position), and such that the contactor 94a, 94c is in contact with the switches 79a or 79c (the "off" mode) when the actuating assembly 50 is engaged with recess 64a or 64c (the disengaged position). The various positions of the cam 94 are recognized by the switches 79a, 79b, 79c which may therefore respond with a corresponding signal to the controller (not shown) for controlling the electrical power to the motoring assembly 46. Optionally, the electrical power may be put back into the "on" mode as soon as the contactors 94a, 94c depart from the switch 79a or 79c, and may be put back into the "off" mode as soon as the actuating assembly 50 departs from the switch 79b for helping the user of the control mechanism 40 to engage or disengage the worm gear 74 with the ring gear 56.

This arrangement provides for the passage of the control mechanism 40 from its engaged configuration to its disengaged configuration, as will be further explained hereinbelow. Generally stated, the pivoting motion of the link 90 around the pin 92a by the user is transformed into a lateral linear movement of the motoring assembly 46 by the contact of the pin 92b and the slider aperture 78a while the lock structure 78 is engaged in the T-slot 68.

Figure 11:
FIG. 11 is a block diagram of a controller in communication with a global positioning satellite (GPS) system.

The operation of the control mechanism 40 described herein will be explained when integrated to a vehicle provided with an auto-piloting system including an external controller in signal communication with a GPS system (such as controller 1100 in communication with GPS system 1110 (see FIG. 11)). First, the GPS system acquires a position of the vehicle. The external controller receives the information regarding the position of the vehicle and is able to read, receive, stock, compare or calculate various controllable parameters, such as for example, instant vehicle position, speed, and acceleration.

For instance, the controller may be provided with a reference path corresponding to the path the vehicle has to follow for a specific vehicular application. The reference path is compared to the position received from the GPS and the controller decides what level of curvature and speed has to be applied to the steering wheel 52 via the control mechanism 40 for achieving an effective and appropriate piloting of the vehicle.

The controller then establishes that the vehicle has to go in a first direction at a first speed for tending toward the reference path. A command containing that information is translated into a corresponding signal regarding the direction of rotation and the speed at which the electric motor 72 must go for a specific period of time to meet the requirements of the command of the controller.

When the control mechanism 40 is in its engaged configuration, corresponding to the handle portion 86 being in its engaged position and corresponding to the connector 94b of the cam 94 being in contact with the switch 79b, the electric power is put in the "on" mode such that the electric motor 72 is activated.

At that time, the electric motor 72 is able to operate the worm gear 74 according to the command from the controller, at the specific speed and rotation direction and for the specific period of time. The worm gear 74 in a meshing cooperation with the geared surface 62 of the ring gear 56 carries the steering assembly 42 such that the steering wheel 52 of the vehicle is moved according to the command of the controller (not shown). It should be pointed out here that the supporting brackets 45a, 45b, 45c will prevent the motoring assembly 46 from rotating upon operation of the steering assembly 42.

The user of the vehicle may further need to stop the command or remove the auto-piloting system, by operating the actuating assembly 50. First the user moves the handle portion 86 from the engaged position in the recess 64b to the disengaged position in either one of the recesses 64a, 64c.

In doing so, the disengaged configuration of the control mechanism 40 is initiated, corresponding to either one of the connectors 94a, 94c of the cam 94 being in contact with its corresponding switch 79a, 79c, such that the electric power is put in the "off" mode and inactivates the electric motor 72. Further to this, when the handle portion 86 is put in its disengaged position, the pin 92b travels within the slot 66 such as to carry the link 90 about the pivotal connection 67 and such as to abut with the lock structure 78 within the slider aperture 78a.

The lock structure 78 and the motoring assembly 46 are therefore free to travel linearly within the T-slot 68 of the mounting structure 44 such as to either force or oppose to the meshing between the worm gear 74 and the ring gear 56. This external force has a tendency "unmesh" the cooperation between the motoring assembly 46 and the steering assembly 42, concluding thereby the switch from the engaged configuration to the disengaged configuration of the control mechanism 40.

When the control mechanism 40 is in its disengaged configuration, the steering wheel 52 may be manually operated by the user of the vehicle.

For re-activating the control mechanism 40 from its disengaged configuration to its engaged configuration, the user moves the handle portion 86 from its disengaged position in either recesses 64a or 64c toward its engaged position in the recess 64b. At that time, the connectors 94a, 94c are no longer in contact with respective switches 74a, 74c, which may trigger a signal to the controller (not shown) regarding the re-activation of the electric motor 72 for re-operating the worm gear 74 in order to facilitate the meshing of the worm gear 74 with the ring gear 56.

In doing so, the pin 92b is carried within the slot 66 such as to pivot the link 90 about the pivotal connection 67. The pin 92b further abuts with the lock structure 78 within the slider aperture 78a, in such a way as to force the motoring assembly 46 to travel within the T-slot 68 of the mounting structure 44. At that time the meshing cooperation between the worm gear 74 and the ring gear 56 is re-established and the contact between the connector 94b of the cam 94 with the switch 79b may be made to allow for the electric power to be put back to the "on" mode and re-activate the electric motor 72 and the control mechanism 40 thereby.

As stated hereinabove, an alternative way of disabling the control mechanism 40, requires that the user directly steer the steering wheel 52 in one direction, such that the tensioning force in the spring member 91 is overcome by the transmission of the force deployed by the user via the steering wheel 52, the ring gear 56 and the worm gear 74 such that the attachment portion 70a of the motoring assembly 56 starts sliding in the T-slot 68. The lateral linear movement of the motoring assembly 46 may then activate the pivoting motion of the link 90 around the pin 92a via the contact between the pin 92b and the slider aperture 78a if the force deployed by the user is enough to overcome the tensioning force in the spring member 91. In the latter case, the roller 86a may then leave its encapsulation in the recess 64b by the pivotal movement of the joint assembly 88 about the pin 93 such that the actuating assembly 50 may be forced out its engaged position.

Figure 12:
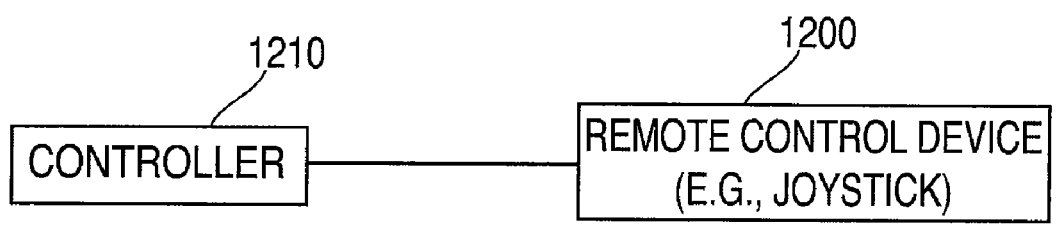
FIG. 12 is a block diagram of a controller in communication with a remote control device, such as a joystick.

A person skilled in the art will easily understand that the control mechanism 40 described herein may be used with a plurality of different controlling systems. For example, the GPS signal to the controller may be replaced by a signal provided by a user looking at a camera positioned on the vehicle or by a user positioned at a distance from the vehicle. The user is provided with a commanding means, such as for example a joystick 1200, or an outside steering wheel in signal communication with the controller 1210 via emitted signals received by the controller 1210 (see FIG. 12).

A steering mechanism 140 according to a second embodiment of the invention is illustrated in FIGS. 8 to 10. For concision purposes, only the differences between the steering mechanism 140 and the steering mechanism 40 illustrated in FIGS. 1 to 7 will be described hereinbelow.

In this illustrative embodiment, the steering mechanism 140 includes a steering assembly 142, a mounting structure 144, a motoring assembly 146, a cable 147 forming a closed loop, and an actuating assembly 150.

The steering assembly 142, as illustrated in more details in FIG. 10, includes a top element 154 and a bottom assembly 156 sandwiching the steering wheel 152. The bottom assembly 156 is generally made of two stacked pulleys 156a, 156b including grooves 157 which are so configured and sized as to cooperate with the cable 147.

The mounting structure 144 is supporting the motoring assembly 146 and is positioned, as shown in the illustrative embodiment of FIG. 8, on the floor of a cabin of a vehicle. The motoring assembly 146 includes an electric motor 146a driving a pulley 146b. The pulley 146b cooperates with the pulleys 156a, 156b via the cable 147 for steering the wheel 152 of the vehicle when the actuating mechanism 150 is in its engaged position.

The cable 147 includes an external guide envelope 147a, an internal cable member 147b longitudinally sliding within the external guide envelope 147a, and an internal tensioning member (not shown). The internal member 147b is configured and sized as to matingly cooperate with the grooves 157 of the pulleys 156a, 156b and as to be driven by the pulley 146b of the motoring assembly 146. The external guide envelope 147a allows alignment of the cable member 147b with grooves 157.

The actuating mechanism 150 includes a switch control board 150a generally mounted on the top element 154 and in communication with an electric clutch (not shown).

In operation, the control mechanism 140 allows to steer the wheel of a vehicle when the internal tensioning member (not shown) of the cable 147 is tensioned, corresponding to the electric clutch (not shown) being engaged with the pulley 146b.

At that time, the internal cable member 147b is matingly engaged with the pulleys 156a, 156b, 146b such that upon operation of the electric motor 146, the rotation of pulley 146b provides a corresponding rotation of the steering wheel 152 through the fixed (under tension) connection between the internal cable member 147b and the grooves 157 of the pulleys 156a, 156b.

When the switch control board 150a of the actuating mechanism 150 is put in its "off" mode, corresponding to a signal disengaging the electric clutch (not shown) from the pulley 146b, the tension provided to the internal tensioning member (not shown) of the cable 147 is not enough for driving the steering wheel 152.

At that time, the fixed (under tension) connection between the internal member 147b and the grooves 157 of the pulleys 156a, 156b is set loose, such that the steering wheel 152 and the steering assembly 142 are allowed to move with respect to the cable 147.

Alternatively, the electric clutch (not shown) may be replaced by a tensioner in contact with the internal tensioning member (not shown) of the cable 147 for providing the tension level to the internal tensioning member when the switch control board 150a is in the "on" mode.

Although the present invention has been described hereinabove by way of preferred embodiments thereof, it can be modified, without departing from the spirit and nature of the subject invention as defined in the appended claims.

What is claimed is:

1. A control mechanism for a steering wheel of a vehicle, the control mechanism comprising:
    a steering assembly configured to mount to a steering wheel of a vehicle, the steering assembly comprising a first component;
    a motoring assembly comprising a second component, wherein the motoring assembly is operative to move the steering wheel via the steering assembly when the first component is mechanically engaged with the second component; and
    a disengagement mechanism configured to mechanically disengage the first and second components in response to a user-applied force to the steering wheel.

2. The control mechanism of claim 1, wherein the disengagement mechanism comprises a spring member providing a tensioning force to keep the first and second components mechanically engaged, and wherein the user-applied force overcomes the tensioning force.

3. The control mechanism of claim 1 further comprising:
    a controller coupled with the motoring assembly.

4. The control mechanism of claim 3, wherein the controller is in communication with a global positioning satellite (GPS).

5. The control mechanism of claim 3, wherein the controller is in communication with a remote control device.

6. The control mechanism of claim 5, wherein the remote control device comprises a joystick.

7. The control mechanism of claim 1, wherein the first component comprises a ring gear.

8. The control mechanism of claim 1, wherein the second component comprises a worm gear.

9. The control mechanism of claim 1 further comprising:
    a structure comprising a plurality of recesses, wherein the first and second components are mechanically engaged when a handle coupled with the motoring assembly is positioned in a first recess of the plurality of recesses, and wherein the first and second components are mechanically disengaged when the handle is positioned in a second recess of the plurality of recesses.

10. The control mechanism of claim 9 further comprising:
    a plurality of switches adjacent the plurality of recesses, wherein the plurality of switches selectively turn on and off a motor of the motoring assembly depending on a position of the handle with respect to the plurality of recesses.

11. The control mechanism of claim 1, wherein the steering assembly comprises a pulley.

12. The control mechanism of claim 1, wherein the steering assembly comprises a first assembly element and a second assembly element, wherein the steering assembly is configured mount to the steering wheel by sandwiching the steering wheel between the first and second assembly elements.

13. The control mechanism of claim 1, wherein the steering assembly is configured to mount to spokes of the steering wheel.

14. A control mechanism for a steering wheel of a vehicle, the control mechanism comprising:
    a steering assembly configured to mount to a steering wheel of a vehicle, the steering assembly comprising a ring gear;
    a motoring assembly comprising an electric motor and a worm gear, wherein the motoring assembly is operative to move the steering wheel via the steering assembly when the ring gear is mechanically engaged with the worm gear;
    a controller in communication with a global positioning satellite (GPS), wherein the controller is operative to provide commands to the motoring assembly; and
    a disengagement mechanism configured to mechanically disengage the ring gear and the worm gear in response to a user-applied force to the steering wheel.

15. The control mechanism of claim 14, wherein the disengagement mechanism comprises a spring member providing a tensioning force to keep the ring gear and the worm gear mechanically engaged, and wherein the user-applied force overcomes the tensioning force.

16. The control mechanism of claim 14 further comprising:

a structure comprising a plurality of recesses, wherein the ring gear and the worm gear are mechanically engaged when a handle coupled with the motoring assembly is positioned in a first recess of the plurality of recesses, and wherein the ring gear and the worm gear are mechanically disengaged when the handle is positioned in a second recess of the plurality of recesses.

17. The control mechanism of claim 16 further comprising:

a plurality of switches adjacent the plurality of recesses, wherein the plurality of switches selectively turn the electric motor on and off depending on a position of the handle with respect to the plurality of recesses.

18. The control mechanism of claim 14, wherein the steering assembly further comprises an assembly element, wherein the steering assembly is configured mount to the steering wheel by sandwiching the steering wheel between the assembly element and the ring gear.

19. The control mechanism of claim 14, wherein the steering assembly is configured to mount to spokes of the steering wheel.

\* \* \* \* \*